(12) United States Patent  (10) Patent No.: US 6,482,336 B2
Savant  (45) Date of Patent: Nov. 19, 2002

(54) NON-LAMBERTIAN GLASS DIFFUSER AND METHOD OF MAKING

(76) Inventor: Gajendra D. Savant, 3727 W. 226th St., Torrance, CA (US) 90505

( * ) Notice: Subject to any disclaimer, the term of this patent is extended or adjusted under 35 U.S.C. 154(b) by 0 days.

(21) Appl. No.: 09/731,541

(22) Filed: Dec. 7, 2000

(65) Prior Publication Data

US 2001/0000739 A1 May 3, 2001

Related U.S. Application Data

(62) Division of application No. 09/136,995, filed on Aug. 20, 1998, now Pat. No. 6,352,759.

(51) Int. Cl.[7] .............................................. B29D 11/00
(52) U.S. Cl. ................................. 264/1.1; 65/93; 430/1; 430/321
(58) Field of Search ................................ 65/44, 93, 95, 65/105; 264/1.1, 1.21, 2.5, 2.7; 430/1, 2, 320, 321

(56) References Cited

U.S. PATENT DOCUMENTS

| | | | | |
|---|---|---|---|---|
| 1,718,824 | A | * 6/1929 | Jungeos ........................ | 65/214 |
| 2,610,444 | A | * 9/1952 | Kurz .............................. | 65/44 |
| 4,842,633 | A | * 6/1989 | Kuribayoshi et al. ........... | 65/44 |
| 5,049,177 | A | * 9/1991 | Nakata ........................... | 65/93 |
| 5,224,978 | A | * 7/1993 | Hermant et al. ................ | 65/94 |
| 5,287,427 | A | * 2/1994 | Atkins et al. .................. | 385/124 |
| 5,365,354 | A | 11/1994 | Jannson et al. ................ | 359/15 |
| 5,534,386 | A | 7/1996 | Petersen et al. ............... | 430/320 |
| 5,609,939 | A | 3/1997 | Petersen et al. ............... | 428/141 |
| 5,735,988 | A | 4/1998 | Chau et al. ................... | 156/209 |
| 5,838,403 | A | 11/1998 | Jannson et al. ................ | 349/65 |
| 5,922,238 | A | 7/1999 | Savant et al. .................. | 252/1 |
| 5,959,106 | A | 9/1999 | Petersen et al. ............... | 349/64 |

OTHER PUBLICATIONS

Shagam, R.N., Ph.D., "Light Shaping Diffusers™ Simplify Aircraft Inspection," *Photonics Spectra*, Nov. 1994.

Dusinberre, B., "Light Shaping Diffusers Enhance Depth–Finder Performance," *Laser Focus World*, Jun. 1995.

Szczesniak, S., & Shie, R., "Machine Vision for Semiconductor Manufacture," *Photonics Spectra*, Nov. 1995.

"Directional Turning Film™", Physical Optics Corporation, 1996, Brochure.

Giancola, S., "Hologrpahic Diffuser Makes Light Work of Screen Tests," *Photonics Spectra*, Aug. 1996.

Laine, J., "Mini Display," *Design News*, Dec. 15, 1997.

"Light Shaping Diffusers® Technical Data Sheet," Physical Optics Corporation, Jul. 1, 1998.

"Light Shaping Diffuser® Transmissive Thin Film Price List," Physical Optics Corporation, May 1, 1998.

"Light Shaping Diffuser® Transmission Kits Price List," Physical Optics Corporation, May 1, 1998.

"Light Shaping Diffuser™ Transmission Sheet Price List," Physical Optics Corporation, May 1, 1998.

* cited by examiner

*Primary Examiner*—Donald J. Loney
(74) *Attorney, Agent, or Firm*—Nilles & Nilles; Leonard Tachner (57) ABSTRACT

A glass diffuser is fabricated by first producing a metal shim submaster or other high temperature resistant diffuser having a surface relief structure on one surface. A glass substrate material is heated to a suitable temperature and at least one exposed surface is thereby softened to a desired degree. The submaster diffuser, and particularly the surface relief structure, is then placed in contact with the exposed and softened glass substrate material in order to replicate the surface relief structure in the glass material. The submaster diffuser and the glass substrate are separated and then the glass is allowed to cool to form a glass diffuser.

14 Claims, 6 Drawing Sheets

NON-LAMBERTIAN GLASS DIFFUSER AND METHOD OF MAKING

CROSS-REFERENCE TO RELATED APPLICATIONS

This application is a divisional of application Ser. No. 09/136,995, filed Aug. 20, 1998 now U.S. Pat. No. 6,352,759.

BACKGROUND OF THE INVENTION

1. Field of the Invention

The present invention relates generally to optical elements, and more particularly to a non-Lambertian glass diffuser replicated from a master diffuser for use in active lighting applications.

2. Description of the Related Art

Methods for manufacturing and replicating optical components utilizing a master and one or more submasters to achieve a final diffuser product having desired light diffusing characteristics are well known. In many of these methods, the creation of the first generation submaster from the master destroys the master rendering it unavailable for later use. There are also other methods of making a replica of a master which contains optical features identical to that of the master without destroying the master. These other methods are described in one or more pending U.S. applications, referenced below, which are assigned to the assignee of the present invention. However, with each of these methods, the submasters are each made from materials which are not significantly durable or suitable for use under high temperature conditions.

The specific embodiments described below regarding the rubber submaster and the silver and nickel submaster are disclosed in co-pending U.S. application Ser. No. 09/052,586 now U.S. Pat. No. 6,159,398 entitled "Method of Making Replicas While Preserving Master," commonly assigned to the assignee of the present invention.

One such method involves recording optical features on a photosensitive medium using coherent or incoherent light. The photosensitive medium is then further processed to create a master optical product. A layer of two part silicone epoxy is poured over the master to replicate the optical surface features of the master photosensitive medium in the silicone material. The silicone epoxy layer gets cured at room temperature and becomes rubber. The silicone material is then cured further and separated from the master to obtain a silicone submaster. The soft silicone submaster is then used to make successive generations of submasters or final optical products by covering the soft submaster with a layer of epoxy, covering the layer of epoxy with a plastic substrate, curing the epoxy and separating the epoxy and plastic substrate from the submaster.

Another method of creating a submaster for an optical product involves coating the recorded and developed photosensitive medium master discussed above with a layer of silver instead of silicone. A layer of nickel is electroplated onto the silver layer and then the silver layer and layer of nickel are removed from the photosensitive material or medium to form the submaster. The combined silver and nickel backing form a metal shim submaster which is then used to create final optical products by embossing the surface features of the submaster into epoxies, plastics or polycarbonate materials, or by injection molding such materials into a mold carrying the submaster.

One significant shortcoming with each of these methods is that the final optical products created from the submasters are made from relatively non-durable materials such as plastics, epoxies, or polycarbonate composites. These materials are not suited for use near extremely high temperature light sources and are also not well suited for use outdoors under exposure to cyclical or extreme environmental conditions.

Other commonly assigned U.S. patents and pending applications disclose somewhat related methods for making and recording optical products and replicating those products so that they may be mass produced. For example, U.S. Pat. No. 5,365,354 entitled "Grin Type Diffuser Based on Volume Holographic Material", U.S. Pat. No. 5,534,386 entitled "Homogenizer Formed Using Coherent Light and a Holographic Diffuser", and U.S. Pat. No. 5,609,939 entitled "Viewing Screen Formed Using Coherent Light", all owned by the present assignee relate to methods for recording and replicating optical products. Each of these U.S. patents is incorporated herein by reference for purposes including, but not limited to, indicating the background of the present invention and illustrating the state of the art.

Related U.S. patent applications include Ser. No. 08/595,307 entitled "LCD With Light Source Destructuring and Shaping Device" now U.S. Pat. No. 5,956,106, U.S. Ser. No. 08/601,133 entitled "Liquid Crystal Display System with Collimated Backlighting and Non-Lambertian Diffusing" now U.S. Pat. No. 5,838,403, U.S. Ser. No. 08/618,539 entitled "Method of Making Liquid Crystal Display System" now U.S. Pat. No. 5,735,988, U.S. Ser. No. 08/800,872 entitled "Method of Making Replicas and Compositions for Use Therewith"now U.S. Pat. No. 5,922,238, and U.S. Ser. No. 09/075,023 entitled "Method and Apparatus for Making Optical Masters Using Incoherent Light now abandoned." All the above applications are owned by the present assignee and are hereby incorporated by reference for purposes including, but not limited to, indicating the background of the present invention and illustrating the state of the art.

SUMMARY OF THE INVENTION

A primary object of the present invention is to provide a method for making a replica of a master diffuser containing optical features of the diffuser in an extremely durable material such as glass. It is another object of the invention to provide a diffuser made from a material such as glass which is highly durable and suitable for use under extreme conditions such as adjacent a high temperature active light source such as for liquid crystal displays and the like.

In accordance with the present invention, these objects are achieved by a glass optical element having a unitary body structure made from a glass material and at least one optical surface. A surface relief structure is replicated onto the at least one optical surface from a metal submaster optical element. The glass material is first heated to a suitable temperature in order that the glass be softened to a predetermined level of softness. The softened glass is supported on a sturdy support such as a flat metal surface with at least one surface of the glass substrate exposed. The exposed surface is contacted with the surface relief structure of the metal shim submaster optical element for a length of time while pressure is applied to force the metal submaster optical element and softened glass substrate material against one another during at least a portion of the length of time of contact. By the combination of the softness of the glass, the pressure applied between the master optical element, the glass substrate and the sturdy support surface, and the duration of time of such contact and applied pressure, the surface relief structure is replicated in the glass material. The pressure is then released and the master optical element or metal shim and glass material are separated from one another. The glass is then cooled to produce the glass diffuser according to the invention.

The master optical element may in one embodiment be a metal shim having a silver layer backed by a chromium or nickel layer. The silver layer includes a surface relief structure recorded from a photoresist medium by any one of many conventional means. Other master optical elements may be utilized depending upon the particular glass and process characteristics necessary for production of a desired glass diffuser.

The glass substrate material may also be heated utilizing a number of means. For example, the glass substrate material may be placed within a furnace to elevate the temperature of the glass prior to the application of pressure between the glass material and the master optical element. Alternatively, the glass substrate material may be exposed to a direct heat source such as an oxyacetylene flame in order to sufficiently soften an exposed surface of the glass material. In another alternative, a molten glass material may be slightly cooled to a softened state and then contacted with the master optical element during initial manufacture of a glass substrate thereby replicating the surface relief structure directly into the original glass object.

Using this methodology, the assignee has demonstrated the fabrication of glass diffusers in the laboratory. Different types of metals can be used in place of silver, and or nickel-chromium. One alternative choice of such a metal is steel having a higher percentage of carbon. One can also effectively replicate the glass diffuser using a graphite based diffuser master. For example, a diffuser master structure can be ion milled onto the steel metal and/or graphite materials which have thermal expansion coefficients closer to the glass. The use of graphite is critical when a more softened or liquified glass is used.

These and other aspects and objects of the present invention will be better appreciated and understood when considered in conjunction with the following description and accompanying drawings. It should be understood, however, that the following description, while indicating preferred embodiments of the present invention, is given by way of illustration and not of limitation. Many changes and modifications may be made within the scope of the present invention without departing from the spirit thereof and the invention includes all such modifications.

BRIEF DESCRIPTION OF THE DRAWINGS

A clear conception of the advantages and features of the present invention, and of the construction and operation of typical mechanisms provided with the present invention, will become more readily apparent by referring to the exemplary and therefore non-limiting embodiments illustrated in the drawings accompanying and forming a part of this specification, and in which.

DETAILED DESCRIPTION OF THE PRESENTLY PREFERRED EMBODIMENTS

Figure 1:
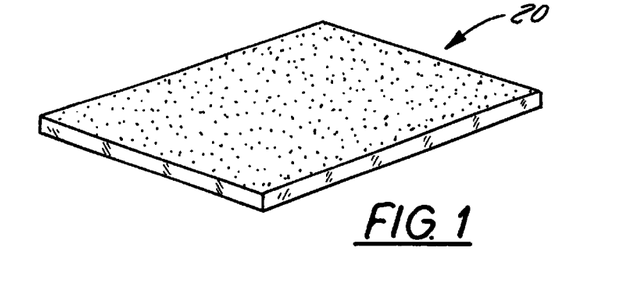
FIG. 1 illustrates a perspective elevational view of a glass diffuser constructed in accordance with one embodiment of the present invention.

FIG. 1 illustrates an elevational perspective view of a transparent glass diffuser 20 constructed and fabricated in accordance with one embodiment of the present invention. The glass diffuser 20 is generally fabricated according to the invention by first creating a master diffuser from a durable material such as a metal. A silver layer having a nickel backing may, for example, be created as a submaster diffuser. The submaster is then used for compression molding under high pressure and high temperature the diffuser surface from the submaster into a glass substrate. The resulting glass diffuser 20 is extremely scratch resistant, high temperature resistant and also resistant to breaking.

Figure 2A:
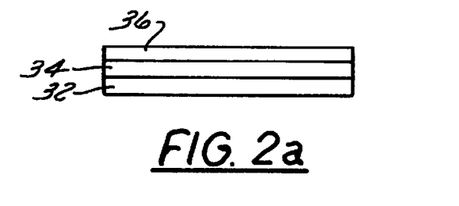
FIGS. 2A–2D illustrate a schematic representation of the steps for forming a metal shim submaster diffuser which is then utilized to produced the glass diffuser shown in FIG. 1.

FIGS. 2A–2D illustrate schematically one method for manufacturing a metal shim submaster diffuser 30. FIG. 2A illustrates first providing a substrate of a planar material such as a glass substrate 32 having a layer of photoresist material 34 thereon. The thickness of the photoresist may be, for example, approximately 20 microns although other thicknesses may advantageously be used, depending upon the particular application. A surface relief structure capable of producing desired optical characteristics is recorded in the photoresist by any means such as those disclosed in the aforementioned patent applications and patents. A layer of silver 36 is then vacuum coated onto the photoresist layer 34 using standard procedures and processes and may, for example, have a thickness in a range of about 500–1000 Å. The silver layer 36 replicates the master diffuser surface structure formed in the photoresist material layer 34.

Figure 2B:
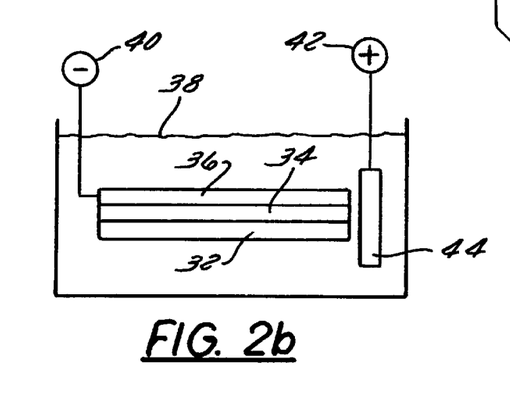
Figure 2C:
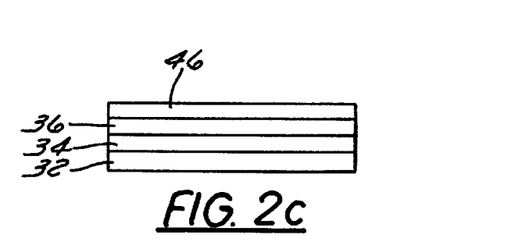
Figure 2D:
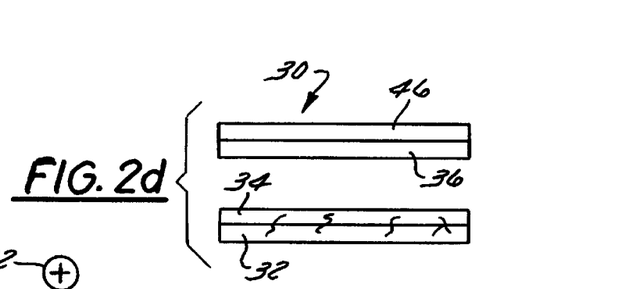

FIG. 2B illustrates that this composite structure including the substrate 32, photoresist layer 34, and silver layer 36 is then placed in a solution or bath 38. An anode 40 is connected to the silver layer 36 and a cathode 42 attached to a nickel plate 44 submersed in the same bath 38. The resulting electrochemical reaction deposits a layer of nickel 46 onto the silver layer 36 as is further illustrated in FIG. 2C. This backing layer, for example, may be in a range anywhere from approximately about 0.005 inches to about 0.5 inches thick, or more or less. The layer of silver 36 and the layer of nickel 46 in combination define the metal shim 30 which is then separated as is illustrated in FIG. 2D from the photoresist layer 34. This separation may destroy the photoresist layer 34 and glass substrate 32.

The resulting metal shim 30 includes both the silver layer 36 and the nickel layer 46 wherein the exterior surface of the silver layer 36 includes the surface structure or image replicated from the photoresist layer 34 of master substrate 32. Once this metal shim submaster 30 is created, it may then be used as a tool or submaster shim to replicate the same surface structure into a plate of glass as described below in order to form the glass diffuser 20. The nickel plate 44 may be substituted, for example, by a chromium plate or a chromium nickel plate to form either a chromium backing or chromium nickel backing, respectively, on the silver layer.

Figure 3:
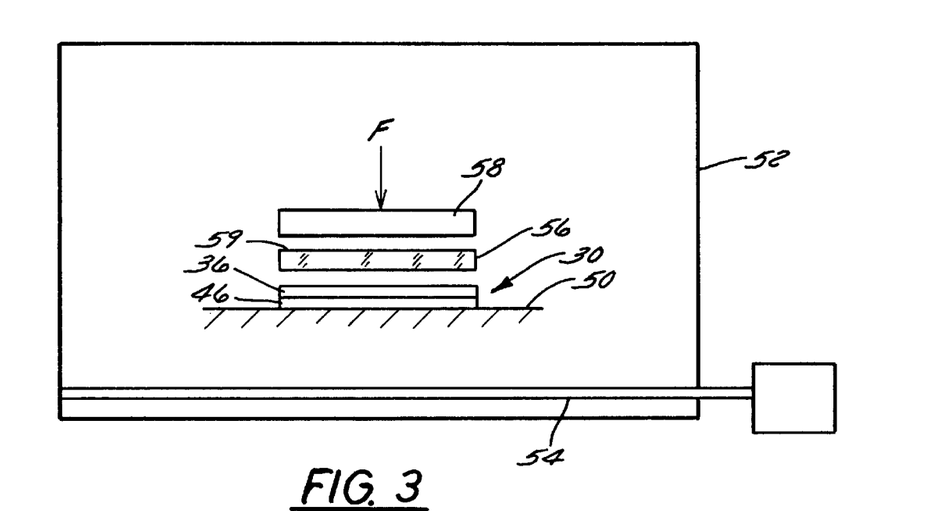
FIG. 3 illustrates one embodiment of the process and apparatus for forming the glass diffuser shown in FIG. 1.

FIG. 3 illustrates one embodiment of a process for manufacturing the glass diffuser 20 using the metal shim master 30. The process includes providing a rigid or sturdy support surface 50 manufactured from a metal or some other high temperature resistant material. The support surface 50 is housed within a high temperature furnace 52 having a heating element 54 capable of heating the interior of the furnace to a suitable elevated temperature as described below. The metal shim master 30 is then placed on the support surface 50 with the silver layer 36 facing upward exposing the surface relief structure.

A glass substrate 56, which in this embodiment is prefabricated, is selected according to principals described in more detail below and placed in the furnace on top of the silver layer 36 of the master shim 30. A suitable pressure plate 58 which is also preferably constructed from a metal or other high temperature resistant and substantially rigid or sturdy material is positioned over an exposed surface 59 of the glass substrate 56 within the furnace 52.

Heat is then supplied to the interior of the furnace 52 via the heating element 54 to increase the temperature to a suitably high temperature in order to soften at least the exposed surface 59 of the glass substrate 56. The heating element may be of any type such as, for example, a gas burner or an electric coil or burner. The suitable temperature is primarily determined by the glass characteristics as described in more detail below. Once the furnace 52 reaches the desired or suitable temperature and the exposed surface 59 of the glass substrate 56 reaches the desired softness, the pressure plate 58 is lowered to apply pressure to the glass substrate 56 which in turn presses against the surface relief structure of the silver layer 36 and against the metal shim master 30.

By heating the glass substrate to the appropriate temperature and applying the appropriate amount of pressure via the pressure plate 58, the exposed surface 59 of the glass substrate 56 will permanently receive and replicate the surface relief structure of the silver layer 36.

Figure 6:
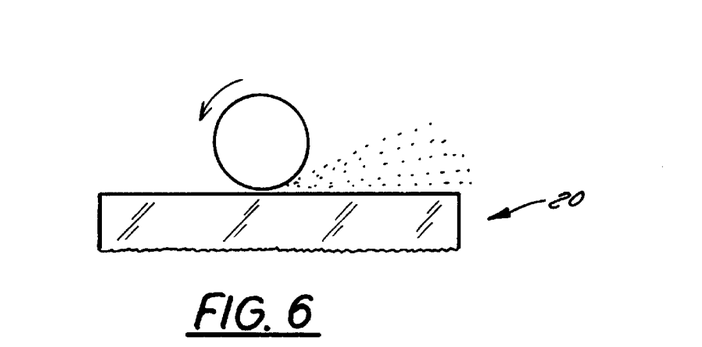
FIG. 6 illustrates a glass substrate undergoing a polishing or lapping process in order to form the glass diffuser shown in FIG. 1.

The glass substrate 56 is then removed from the furnace 52 and cooled in order to re-harden the substrate. As illustrated in FIG. 6, the side opposite the exposed surface 59 of the glass substrate 56 which does not carry the replicated surface relief structure may then be worked or further processed accordingly to achieve a particular thickness, critical smoothness or other surface condition. The glass substrate may be polished or lapped or ground down to achieve the desired thickness and smoothness. Thus, FIGS. 3 and 6 illustrate one embodiment of forming the glass diffuser 20 utilizing a high temperature press or stamping process.

Figure 4:
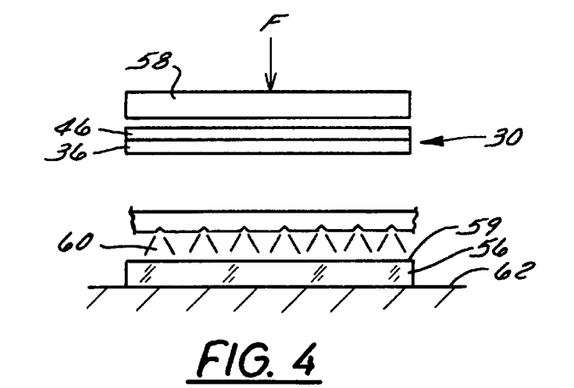
FIG. 4 illustrates an alternative embodiment of a process and apparatus for forming the glass diffuser shown in FIG. 1.

FIG. 4 illustrates one alternative embodiment for producing the glass diffuser 20 utilizing the metal shim master diffuser 30. In this embodiment, the glass substrate 56 is passed through or otherwise subjected to a direct heat source, and particularly preferred is an oxyacetylene flame 60 while supported on a support surface 62. The flame 60 softens at least the exposed surface of the glass substrate 56 to a suitable degree. The metal shim master 30 is then pressed as described above by the plate 58 against the exposed side of the glass substrate 56 with the surface relief side of the silver layer 36 facing the glass substrate.

Figure 5:
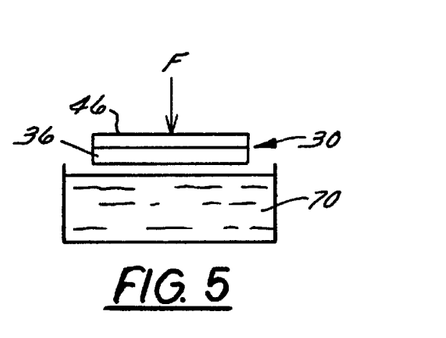
FIG. 5 illustrates a second alternative embodiment of a process and apparatus for producing the glass diffuser shown in FIG. 1.

FIG. 5 illustrates another alternative embodiment for manufacturing the glass diffuser 20 of the invention. The process disclosed in FIG. 5 involves embossing or otherwise replicating the surface relief structure or image of the silver layer 36 from the metal shim master 30 into a liquified and/or softened glass material 70 during the initial manufacture of the glass. In the other two embodiments described above, the glass had already been produced and hardened as a plate of glass. In this embodiment, the glass material is slightly cooled from the initial molten glass state to a softened state without first achieving a hardened glass state.

The metal shim master 30 is disposed adjacent the liquified and/or softened glass material 70. As the glass material 70 is being manufactured and has achieved a pre-determined consistency which is not yet fully solidified or hardened, the metal shim master 30 is brought into contact with the glass material 70. The softened glass preferably has somewhat solidified or slightly cooled from a molten state in order to retain the surface relief structure from the silver layer 36, and so that the master shim is not destroyed. The glass material is then further permitted to solidify or harden to a desired consistency prior to separating the metal shim master 30 from the softened glass material. The softened glass material 70 must, however, achieve a certain level of solidification prior to separation from the metal shim master 30 in order that the surface relief structure on the silver layer 36 is replicated and retained in the exposed surface of the softened glass material.

One example of conventional technology for manufacturing glass is briefly described for illustrative purposes although other technologies may be utilized without departing from the scope and the spirit of the present invention. Furnaces are available that can accept particular types of glass beads which are ground into a powder and then melted within the furnace. Once melted and homogenized into a liquid or fluid described as molten glass, the molten glass is used to fill a mold cavity. The mold may be produced including a particular shape, dimensional characteristics, and surface characteristics for any particular application. Once the mold is filled with the molten glass, it may be cooled to produce a glass object of a particular desired shape and size. Such a glass forming mold may include one or more surfaces which carry an optical surface relief structure formed thereon or may include the metal shim diffuser 30 as described above as a mold insert.

A mold of this type may be utilized to mass produce glass objects having the desired surface relief structure. One such non-diffuser use would be for microscope sample slide plates. The relief surface assists in retaining a sample on the slide plate and yet permits light to pass through the plate and sample. By creating slide plates using this technology, each slide plate will have an identical surface structure thus producing highly consistent analysis results from one sample to the next.

A glass micro-slide plate having the surface relief structure can be used for many applications where micro-slide plates are used, such as in the biological field, for example. The mold may be manufactured to produce surface relief features which correspond to a particular biological sample feature which also in turn enhances growth, sample adhesion, and sample analysis. Any of the standard glass manufacturing techniques can be applied to fabricate a glass diffuser. A cast iron or graphite material can be used to make a mold and/or diffuser master shim. This process can be described as an analogous process of injection molding. The only difference is that the bulk material in this patent application is glass instead of plastic.

The temperature at which the glass substrate 56 or the softened or molten glass material 70 is maintained during the above replication or molding processes is determined and selected primarily according to the glass composition desired for a particular application. Table 1 lists a number of different glass compositions and the softening temperature of each glass composition at which the glass becomes deformable or moldable.

TABLE 1

| Glass | Softening Temperature ° C. (° F.) |
| --- | --- |
| Borosilicate | 716 (1321) |
| Light flint | 585 (1085) |
| Brown flint | 661 (1222) |
| Light barium brown | 731 (1348) |
| Flint | 593 (1100) |
| Fused | 1000 (1832) |
| Brown | 720 (1328) |

As can be seen from Table 1, the softening temperatures for most types of glass are relatively high in comparison to the softening or melting temperatures of the conventional diffuser materials such as plastics, polycarbonates, and epoxies. The temperatures range from the conventional glass such as flint glass which softens at just under 600° C. or 1100° F. to a special glass such as fused glass which softens at a much higher temperature of 1000° C. or 1832° F. Other relatively common glass materials fall somewhere in this range of softening temperatures and may include conventional brown glass, light barium brown glass, brown flint glass, light flint glass, or borosilicate glass. Table 1 is merely a representative sample of various glass types which may be utilized in practicing the present invention. It will be evident to those skilled in the art that other glass compositions and composites may also be utilized without departing from the spirit and scope of the invention.

Glass selection will essentially depend upon what wavelength of light transmission is desired for a particular application. Some glass transmits light at wavelengths in the ultra violet range, such as about 148 to 400 mn, which may be desired. Some glasses are more transparent for a given or desired wavelength than others. A glass diffuser can be constructed according to the invention using virtually any glass, depending upon the application.

It is imperative that the metal shim master 30 not be destroyed during the process of replicating the surface relief structure from the silver layer 36 into the glass substrate 56 or the softened or molten glass 70. To this end, the metal shim 30 including the nickel and silver layers is a preferred embodiment for forming the glass diffuser of the invention. A typical glass material must be significantly softened in order to be pressed or stamped to replicate the surface relief structure from the metal shim master 30. The glass material therefore must be elevated to a very high temperature.

A typical grade of glass softens at about 600° to 700° C. or about 1100° to 1300° F. Therefore, conventional methods of forming master and sub-master diffusers from plastics and epoxies are not sufficient where a glass material is desired for the diffuser 20 as the final product. For example, a conventional compression molding process for manufacturing plastic and epoxy diffusers is typically conducted at temperatures of about 150° C. or about 300° F. The molding or stamping of glass must be conducted at much higher temperatures, on the order of 4–5 times higher, than for conventional materials. Therefore, one preferred diffuser is a metal shim diffuser as described above because the melting points of such a metal shim are significantly higher than for the conventional plastic and epoxy materials.

However, composite glass materials which exhibit many of the durability and high temperature resistance characteristics of conventional glass may be utilized to form the glass diffuser 20 of the invention. Such composite glass materials may have a somewhat lower melting point and/or softening temperature than for conventional glass. However, the softening or melting point will be significantly higher than for the conventional plastic and epoxy materials. It is therefore contemplated that other lower temperature submasters may be utilized when forming the surface relief into the composite glass diffuser. The type of suitable submaster diffuser will depend upon the softening and/or melting temperature of the composite glass substrate as well as the necessary time duration for contact between the submaster diffuser and the glass material. If the contact times are relatively short, the submaster diffuser may not even necessarily need to withstand temperatures at which the selected composite glass material melts or softens. If the required contact times are longer, heat conduction from the glass material to the master may necessitate that the submaster be capable of withstanding such temperatures. In such situations, a submaster may be fabricated in cast iron or graphite material which withstands high temperatures.

However, if products are to be mass produced, it is preferred that the submaster diffuser material be capable of withstanding at least the temperature at which the glass material substrate is to be maintained during manufacture of the glass diffusers. This is so that as the submaster diffuser temperature slowly elevates during repetitive and cyclical contact with successive heated glass substrate materials, the submaster maintains the surface relief structure, and does not become damaged or destroyed over time.

As with the formation of conventional master diffusers and sub-master diffusers, each successive generation of replication of the original master or submaster surface relief may less accurately replicate the actual original surface relief. Therefore, for a particular glass material, it may be necessary to go through a step-by-step or trial and error process in order to achieve a desired light diffusion angle in a finished glass diffuser 20. For example, if a 10° output angle is desired from the glass diffuser 20, it may be necessary to manufacture the original metal shim submaster 30 having a smaller diffusion angle in order that the glass diffuser produces the desired light output characteristics.

Figure 7A:
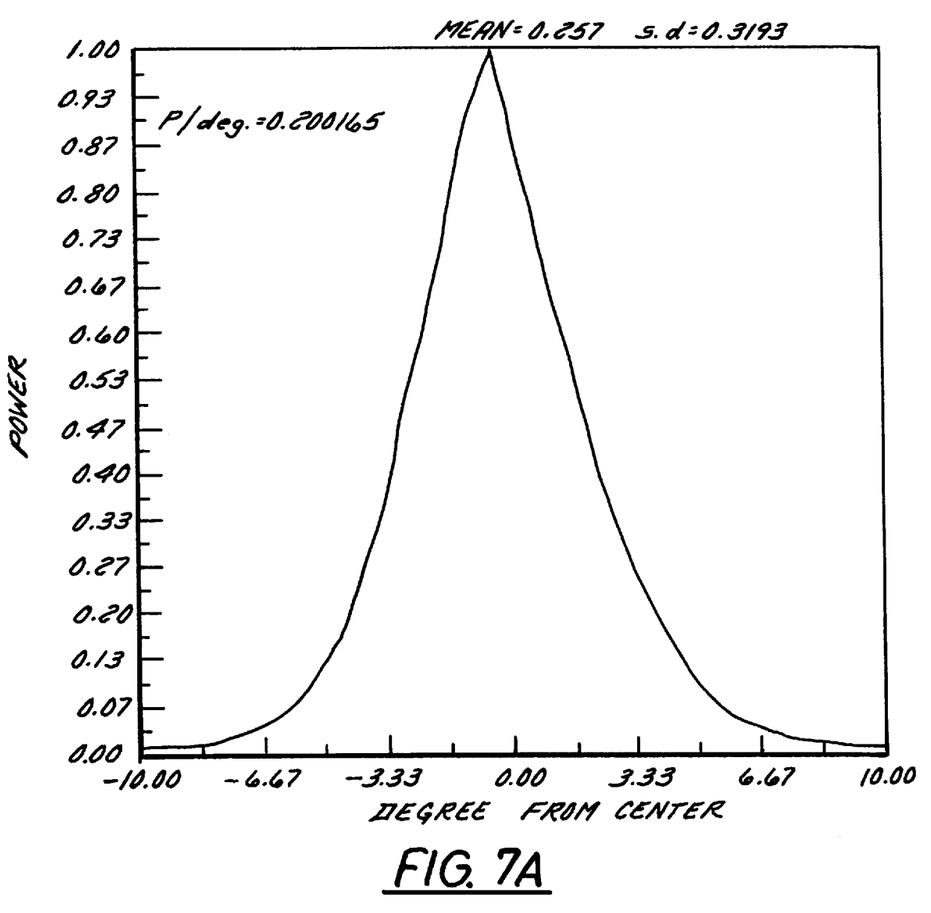
FIGS. 7A and 7B illustrate a plot of, respectively, vertical and horizontal spread of light output against the light input power for a metal master shim diffuser.
Figure 7B:
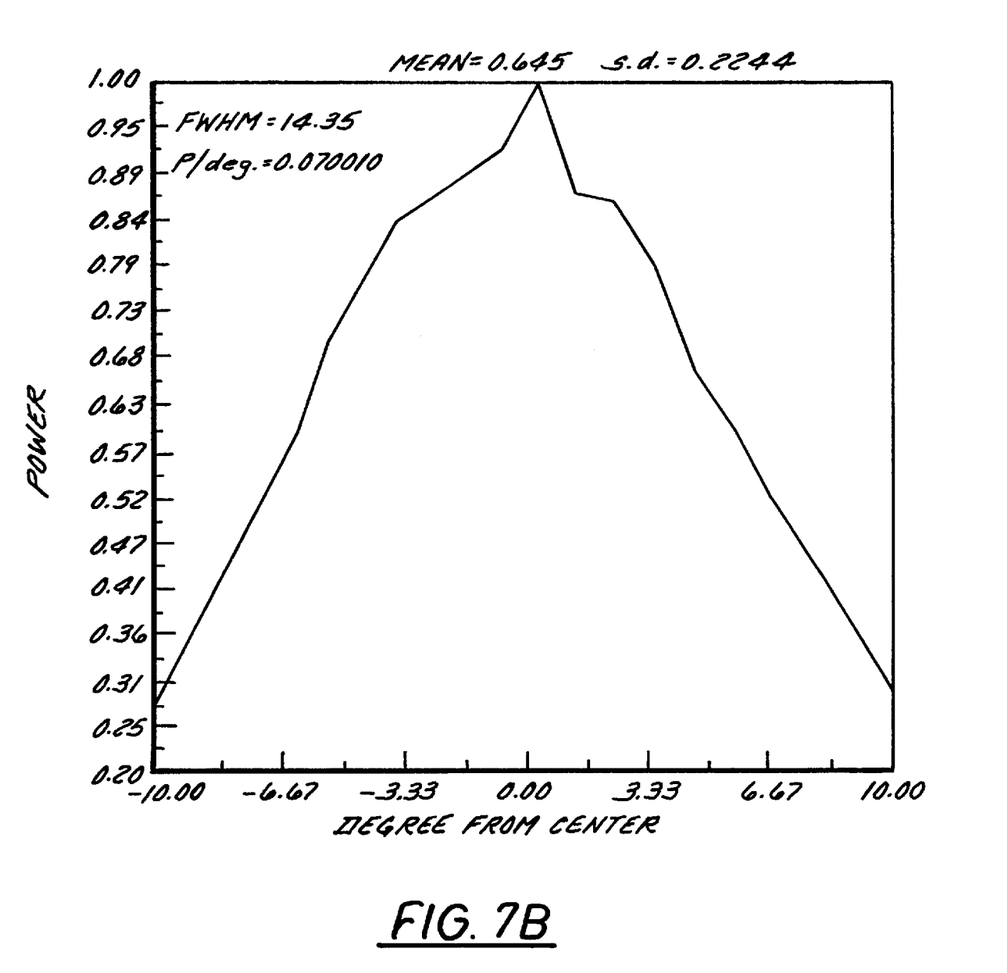
Figure 8A:
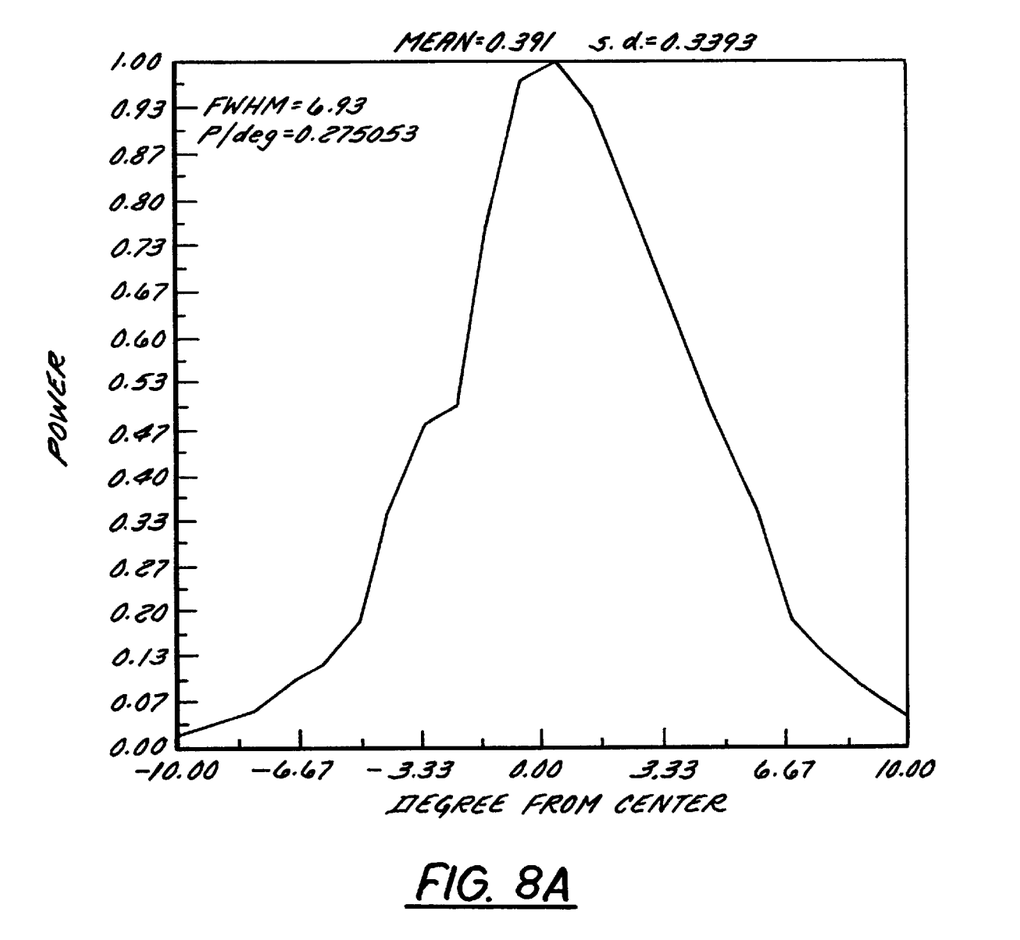
FIGS. 8A and 8B illustrate a plot of, respectively, vertical and horizontal spread of light output against light input power for a glass diffuser as shown in FIG. 1.
Figure 8B:
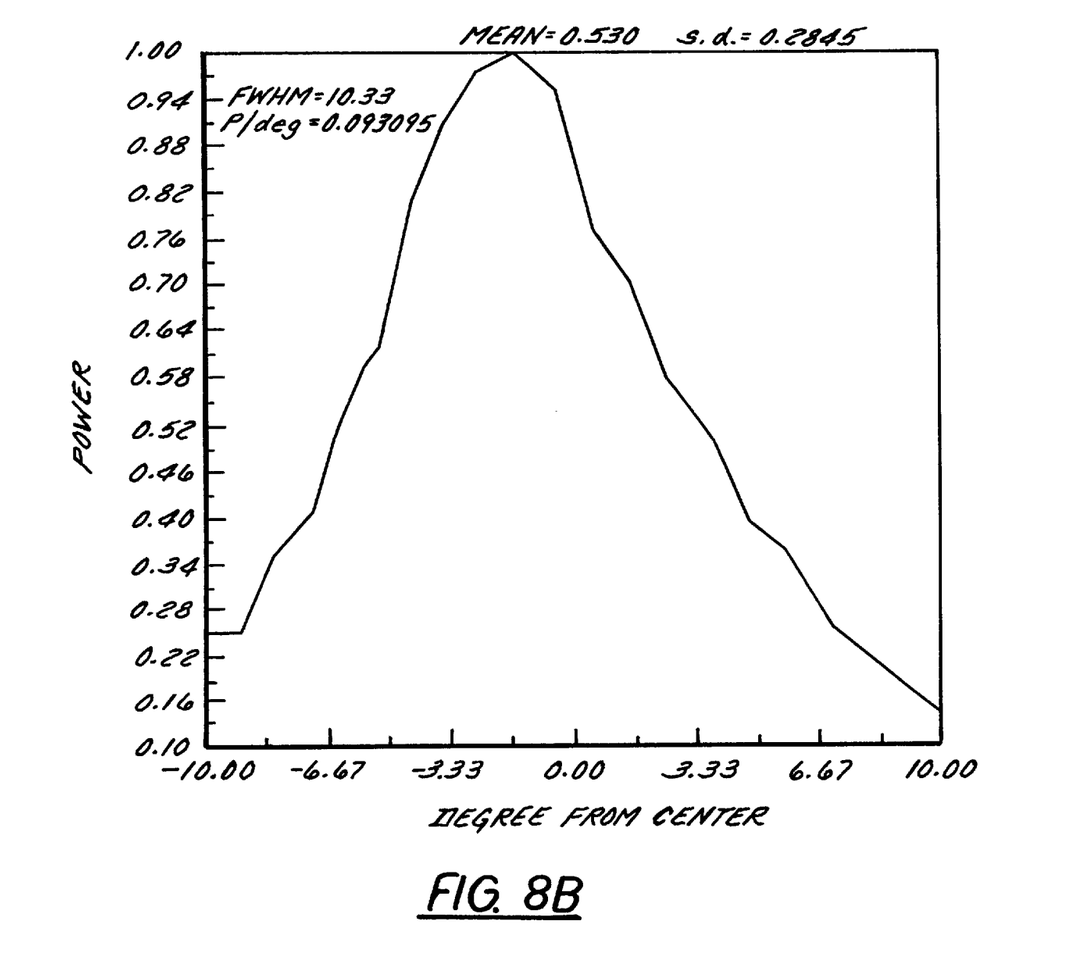

For example, FIGS. 7A and 7B illustrate, respectively, a light output plot of the vertical and horizontal spread of light from a metal shim manufactured as described above. FIGS. 8A and 8B represent, respectively, the vertical and horizontal spread of light from a glass diffuser replicated from the metal shim and fabricated by the process illustrated in and described with regard to FIG. 4. The vertical and horizontal spreads are plotted against light input power. As can be seen, the glass diffuser 20 characteristically has a somewhat wider vertical and horizontal spread for a given light input power than the metal diffuser. Therefore, when fabricating a glass diffuser 20 intended to have particular light diffusion characteristics, the metal shim master 30 must be fabricated having a particular surface structure generating a somewhat narrower vertical and horizontal spread of light output. Each prior generation of the surface relief structure from an original master diffuser to the metal shim submaster may therefore also need to have a successively narrower light output angle as well.

Though the invention was described referring to particular embodiments, many other changes and modifications may be made to the invention as described without departing from the spirit and scope thereof. The scope and spirit of these changes and modifications will become apparent from the appended claims. The scope of the invention is therefore intended only to be limited by the appended claims.

What is claimed is:

1. A method of making a non-Lambertian glass light diffuser, the method comprising the steps of:
   providing a submaster diffuser having an optical surface relief structure on one side;
   preparing a heated glass substrate material having an exposed first surface, the glass substrate material heated to a temperature sufficient to soften at least the first surface;
   contacting the first surface of the glass substrate material with the surface relief structure of the optical element for a predetermined time period;
   applying a pressure forcing the optical element and the glass substrate material against one another for at least a portion of the predetermined time period to substantially replicate the surface relief structure in the first surface of the glass substrate material;
   releasing the pressure;
   separating the optical element and the glass substrate material; and
   cooling the glass substrate material.

2. The method according to claim 1, wherein the step of providing further comprises the step of:
   forming a holographic surface structure as the surface relief structure on the one side of the submaster diffuser.

3. The method according to claim 1, wherein the step of providing further comprises the steps of:
   creating a holographic surface structure in a photoresist medium carried on a substrate body;
   coating the photoersist medium with a layer of silver material replicating the holographic surface structure in the silver material layer;
   electroplating the silver material layer with a nickel material layer; and
   removing the nickel and silver layers from the photoresist medium to form a metal shim as the submaster diffuser having the holographic surface structure as the surface relief structure.

4. The method according to claim 1, wherein the step of preparing further comprises the steps of:
   preparing a softened glass material from a molten glass during its manufacture as the glass substrate material; and
   exposing a surface of the softened glass material to define the exposed first surface.

5. The method according to claim 1, further comprising the steps of:
   preparing a softened glass material from a molten glass during its manufacture as the glass substrate material;
   contacting an exposed surface of the softened glass material with the submaster diffuser; and
   separating the submaster diffuser from the softened glass material prior to cooling the softened glass.

6. The method according to claim 1, wherein the step of preparing further comprises the steps of:
   providing a glass plate substrate; and
   placing the glass plate substrate in a heated furnace.

7. The method according to claim 1, wherein the step of preparing further comprises the steps of:
   providing a direct heat source; and
   exposing at least the exposed first surface of the glass material substrate to the heat source.

8. The method according to claim 1, wherein the step of preparing further comprises the step of:
   providing a glass plate substrate; and
   heating at least the exposed first surface with an oxy-acetylene flame.

9. The method according to claim 1, further comprising the step of:
   placing the glass substrate material on the surface relief structure of the submaster diffuser prior to the step of contacting.

10. The method according to claim 1, further comprising the steps of:
    placing the submaster diffuser on a support surface; and
    placing the glass substrate material on the surface relief structure of the submaster diffuser prior to the step of contacting.

11. The method according to claim 1, wherein the step of contacting further comprises the steps of:
    positioning the glass substrate material over the surface relief structure of the submaster diffuser; and
    lowering the glass substrate material into contact with the submaster diffuser.

12. The method according to claim 1, wherein the step of contacting further comprises the steps of:
    positioning the glass substrate material over the surface relief structure of the submaster diffuser; and
    raising the submaster diffuser into contact with the glass substrate material.

13. The method according to claim 1, wherein the step of contacting further comprises the steps of:
    positioning the submaster diffuser over the glass substrate material; a
    lowering the submaster diffuser into contact with the glass substrate material.

14. The method according to claim 1, wherein the step of applying pressure further comprises the steps of:
    providing a pressure plate connected to a drive cylinder;
    placing the submaster diffuser and the glass substrate material adjacent one another beneath the pressure plate; and
    operating the drive cylinder to force the pressure plate against one of the submaster diffuser and the glass substrate material.

* * * * *